United States Patent Office 2,747,980
Patented May 29, 1956

2,747,980

DEACTIVATING CATALYTIC EFFECT OF METALS

William K. T. Gleim, Orland Park, Ill., assignor to Universal Oil Products Company, Chicago, Ill., a corporation of Delaware No Drawing. Application November 21, 1951, Serial No. 257,643

19 Claims. (Cl. 44—72)

This invention relates to a novel method of deactivating the catalytic effect of a metal contained in an organic material to catalyze oxidative deterioration of the organic material.

Various organic materials contain metals which serve to catalyze the oxidative deterioration of the organic materials. While the present invention is applicable to preventing such deterioration of edible fats and oils, foods, monomers, resins, rubber, etc., it is particularly applicable to the stabilization of hydrocarbon distillates, including kerosene, diesel fuel, fuel oil, etc., and more particularly to the stabilization of motor fuel such as cracked or polymer gasolines.

One method of refining gasoline is the copper sweetening process, in which process the gasoline is contacted with a copper-sweetening reagent. As a result of this treatment, the sweetened gasoline usually contains relatively small amounts of copper compounds which have a catalytic effect on oxidation reactions occurring when the gasoline comes in contact with air. In addition, gasolines come in contact with various metals in the course of refining, storing and shipping operations, and this also may result in the gasoline containing minor amounts of such metals as iron, nickel, chromium, lead, etc.

The compounds of the present invention which serve to deactivate the catalytic effect of metals are referred to as metal deactivators. The metal deactivators are distinguished from the gum inhibitors which are normally added in gasoline to suppress gum formation. The metal deactivator does not substantially suppress the gum formation in the absence of metals and, on the other hand, the gum inhibitor does not suppress the catalytic effect of metals to any considerable extent. The metal deactivator and gum inhibitor supplement each other in serving to stabilize organic compounds and to prevent undesirable deterioration thereof.

In one embodiment the present invention relates to a method of deactivating the catalytic effect of a metal contained in an organic material to catalyze deterioration of said organic material, which comprises adding thereto a compound selected from the diimido esters and diamidines of a dibasic organic acid.

In a specific embodiment the present invention relates to a method of deactivating the catalytic effect of a metal contained in cracked gasoline to catalyze oxidative deterioration of said gasoline, which comprises adding thereto a gum inhibitor and from about 0.0001% to about 0.5% by weight of a compound selected from the diimido esters and diamidines of a lower dibasic organic acid.

In another embodiment the present invention relates to an organic material containing a metal which normally catalyzes oxidative deterioration of said material and additionally containing a compound selected from the diimido esters and diamidines of a lower dibasic organic acid.

The metal deactivators of the present invention may be illustrated by the following general formula:

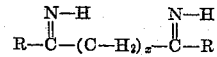

where R is selected from —OR' and —NHR', R' is a hydrocarbon group, and x is 0 or an integer.

In a particularly preferred embodiment of the present invention the diimido esters and diamidines are derived from a lower dibasic organic acid. The lower dibasic organic acids are defined as dibasic organic acids comprising oxalic, malonic, succinic, glutaric and adipic. In accordance with this preferred embodiment x in the above general formula is not greater than 4.

Referring to the general formula heretofore set forth, where R comprises —NHR', the metal deactivator will comprise a diamidine of the lower dibasic organic acid and may be illustrated by the following general formula:

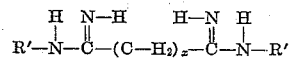

where R' is a hydrocarbon group and x is 0 or an integer preferably not greater than 4.

The preferred diamidines comprise those derived from oxalic and malonic acids. As hereinbefore set forth, R' is a hydrocarbon group and preferably comprises alkyl, aralkyl, aryl, alkaryl, cycloalkyl, etc. and preferably is selected so that the total number of carbon atoms in the deactivator compound is within the range of from about 10 to about 30. However, it is understood that a compound containing a lower or larger number of carbon atoms may be employed in certain cases.

Representative metal deactivator compounds comprising diamidines include the following: Where R' comprises alkyl, the diamidines include dibutyloxaldiamidine, diamyloxaldiamidine, dihexyloxaldiamidine, diheptyloxaldiamidine, dioctyloxaldiamidine, dinonyloxaldiamidine, didecyloxaldiamidine, diundecyloxaldiamidine, didodecyloxaldiamidine, etc., dibutylmalondiamidine, diamylmalondiamidine, dihexylmalondiamidine, diheptylmalondiamidine, dioctylmalondiamidine, dinonylmalondiamidine, didecylmalondiamidine, diundecylmalondiamidine, didodecylmalondiamidine, etc., dipropylsuccindiamidine, dibutylsuccindiamidine, diamylsuccindiamidine, dihexylsuccindiamidine, diheptylsuccindiamidine, dioctylsuccindiamidine, dinonylsuccindiamidine, didecylsuccindiamidine, diundecylsuccindiamidine, didodecylsuccindiamidine, etc., dipropylglutardiamidine, dibutylglutardiamidine, diamylglutardiamidine, dihexylglutardiamidine, dihetpylglutardiamidine, dioctylglutardiamidine, dinonylglutardiamidine, didecylglutardiamidine, diundecylglutardiamidine, didodecylglutardiamidine, etc., diethyladipdiamidine, dipropyladipdiamidine, dibutyladipdiamidine, diamyladipdiamidine, dihexyladipdiamidine, diheptyladipdiamidine, dioctyladipdiamidine, dinonyladipdiamidine, didecyladipdiamidine, diundecyladipdiamidine, didodecyladipdiamidine, etc. Where R' comprises an aralkyl group, the metal deactivator compound may comprise dibenzyloxaldiamidine, diphenylethyloxaldiamidine, diphenylpropyloxaldiamidine, diphenylbutyloxaldiamidine, diphenylamyloxaldiamidine, diphenylhexyloxaldiamidine, diphenylheptyloxaldiamidine, diphenyloctyloxaldiamidine, etc., dibenzylmalondiamidine, diphenylethylmalondiamidine, diphenylpropylmalondiamidine, diphenylbutylmalondiamidine, diphenylamylmalondiamidine, diphenylhexylmalondiamidine, diphenylheptylmalondiamidine, diphenyloctylmalondiamidine, etc., dibenzylsuccindiamidine, diphenylethylsuccindiamidine, diphenylpropylsuccindiamidine, diphenylbutylsuccindiamidine, diphenylamylsuccindiamidine, diphenylhexylsuccindiamidine, diphenylheptylsuccindiamidine, etc., dibenzylglutardiamidine, diphenylethylglutardiamidine, diphenylpropylglutardiamidine, diphenylbutylglutardiamidine, diphenylamylglutardiamidine, diphenylhexylglutardiamidine, etc., dibenzyladipdiamidine, diphenylethyladipdiamidine, diphenylpropyladipdiamidine, diphenylbutyladipdiamidine, diphenylamyladipdiamidine, diphenylhexyladipdiamidine, etc. It is understood that the benzyl ring also may contain one or more hydrocarbon groups and particularly alkyl groups attached thereto.

Where R' in the above general formula comprises an aryl group, the metal deactivator will comprise diphenyloxaldiamidine, diphenylmalondiamidine, diphenylsuccindiamidine, diphenylglutardiamidine, diphenyladipdiamidine. Where R' comprises an alkaryl group the metal deactivator includes such compounds as ditolyloxaldiamidine, dixylyloxaldiamidine, diethylphenyloxaldiamidine, dipropylphenyloxaldiamidine, dibutylphenyloxaldiamidine, diamylphenyloxaldiamidine, dihexylphenyloxaldiamidine, diheptylphenyloxaldiamidine, dioctylphenyloxaldiamidine, etc., ditolylmalondiamidine, dixylylmalondiamidine, diethylphenylmalondiamidine, dipropylphenylmalondiamidine, dibutylphenylmalondiamidine, diamylphenylmalondiamidine, dihexylphenylmalondiamidine, diheptylphenylmalondiamidine, etc., ditolylsuccindiamidine, dixylylsuccindiamidine, diethylphenylsuccindiamidine, dipropylphenylsuccindiamidine, dibutylphenylsuccindiamidine, diamylphenylsuccindiamidine, dihexylphenylsuccindiamidine, etc., ditolylglutardiamidine, dixylylglutardiamidine, diethylphenylglutardiamidine, dipropylphenylglutardiamidine, dibutylphenylglutardiamidine, diamylphenylglutardiamidine, dihexylphenylglutardiamidine, etc., ditolyladipdiamidine, dixylyladipdiamidine, diethylphenyladipdiamidine, dipropylphenyladipdiamidine, dibutylphenyladipdiamidine, diamylphenyladipdiamidine, etc. Here again it is understood that the phenyl ring may contain one or more other hydrocarbon and particularly alkyl substituents attached to the ring.

Where R' in the above general formula comprises a cycloalkyl group, the metal deactivator includes compounds as dicyclobutyloxaldiamidine, dicyclopentyloxaldiamidine, dicyclohexyloxaldiamidine, etc., dicyclobutylmalondiamidine, dicyclopentylmalondiamidine, dicyclohexylmalondiamidine, etc., dicyclopropylsuccindiamidine, dicyclobutylsuccindiamidine, dicyclopentylsuccindiamidine, dicyclohexylsuccindiamidine, etc., dicyclopropylglutardiamidine, dicyclobutylglutardiamidine, dicyclopentylglutardiamidine, dicyclohexylglutardiamidine, etc., dicyclopropyladipdiamidine, dicyclobutyladipdiamidine, dicyclopentyladipdiamidine, dicyclohexyladipdiamidine, etc. Here again it is understood that the cycloalkyl ring also may contain hydrocarbon and particularly alkyl groups attached thereto.

Referring to the first general formula hereinbefore set forth, where R comprises —OR', the metal deactivator will be a diimido ester which may be represented by the following general formula:

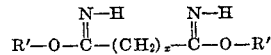

where R' is a hydrocarbon group and $x$ is 0 or an integer preferably not greater than 4.

It is understood that R' may comprise any suitable hydrocarbon group as hereinbefore set forth in connection with the discussion of the diamidines. In order that the present specifications will not be too lengthy, the numerous compounds comprised within the scope of the present invention will not be specifically set forth. Representative compounds of each class include dibutyl diimido ester of oxalic acid, diamyldiimido ester of malonic acid, dihexyl diimido ester of succinic acid, diheptyl diimido ester of glutaric acid, dihexyl diimido ester of adipic acid, etc., dibenzyl diimido ester of oxalic acid, diphenylethyl diimido ester of malonic acid, diphenylpropyl diimido ester of succinic acid, diphenylbutyl diimido ester of glutaric acid, diphenylamyl diimido ester of adipic acid, etc., diphenyl diimido ester of oxalic acid, ditolyl diimido ester of malonic acid, dixylyl diimido ester of succinic acid, diethylphenyl diimido ester of glutaric acid, dipropylphenyl diimido ester of adipic acid, etc., dicyclohexyl diimido ester of oxalic acid, diacid, etc., dicyclohexyl diimido ester of oxalic acid, dicyclopentyl diimido ester of malonic acid, dicyclobutyl diimido ester of succinic acid, dicyclopentyl diimido ester of glutaric acid, dicyclohexyl diimido ester of adipic acid, etc.

While it is generally preferred that the R' substituents be the same, it is understood that the substituents may be different. Furthermore, it is understood that the various compounds which may be used in accordance with the present invention are not necessarily equivalent but all of them will exert some effect in deactivating the catalytic effect of metals in organic materials.

The diamidines may be prepared in any suitable manner. For example, dibenzyloxaldiamidine may be prepared by slowly passing dry cyanogen into a solution of benzylamine in absolute alcohol. After remaining at room temperature for a sufficient time, the resultant crystals of dibenzyloxaldiamidine may be recovered by filtering, after which the crystals preferably are dried. Other diamidine compounds may be prepared by starting with the desired amine and dinitrile.

Similarly, the diimido ester may be prepared in any suitable manner. For example, the reaction of one mol of malodinitrile with two mols of the desired alcohol, preferably in the presence of a suitable acidic catalyst as, for example, dry hydrogen chloride, will form the hydrochloride salt of the desired compound, and the salt may then be reacted with a suitable base as, for example, sodium carbonate, to form the desired diimido ester.

As hereinbefore set forth, the metal deactivator will generally be used in conjunction with a gum inhibitor. Satisfactory gum inhibitors include various phenols, amines, aminophenols, fractions of wood tar oil, etc. Some of these inhibitors are marketed in the form of a solution in a solvent such as alcohol, ether, etc. A particularly suitable gum inhibitor comprises N,N'-di-sec-butyl-p-phenylene diamine. Another particularly suitable gum inhibitor comprises a mixture of a major proportion of N-n-butyl-p-aminophenol and a minor proportion of N,N'-di-n-butyl-p-phenylene diamine in an alcoholic solvent. Still other suitable inhibitors include 2-tert-butyl-4-methoxyphenol, 2,6-ditert-butyl-4-methylphenol, 2,4-dimethyl-6-tert-butylphenol, etc.

The gum inhibitors may be added to gasoline in a concentration of from about 0.0001% to about 1% by weight and more particularly in a concentration of from about 0.001% to about 0.1% by weight. As hereinbefore set forth, the metal deactivator may be utilized in a concentration of from about 0.0001% to about 0.5% by weight and preferably of from about 0.0001% to about 0.05% by weight. The metal deactivator may be marketed as such or dissolved in a suitable solvent which is not reactive therewith. In some cases, when a solvent is used for the gum inhibitor, the same solvent may be used for the metal deactivator and thus the gum inhibitor and metal deactivator, when desired, may be prepared as a mixture in a suitable solvent, and the combined inhibitor and deactivator marketed as a single commodity of a two fold purpose.

As will be shown by the data in the following examples the metal deactivator of the present invention offers the additional advantage that, while it in itself is not a gum inhibitor, it will act as a synergist to increase the effectiveness of the gum inhibitors, while at the same time serving to deactivate the catalytic effect of metals.

The following examples are introduced to illustrate further the novelty and utility of the present invention but not with the intention of unduly limiting the same:

EXAMPLE I

The metal deactivator used in this example comprises dibenzyloxaldiamidine and was prepared by passing dry cyanogen slowly into a solution of benzylamine in absolute alcohol at 0–4° C. The reaction mixture was allowed to stand at room temperature for 20 hours. The resultant crystals of dibenzyloxaldiamidine were filtered and dried. The dried product had a melting point of 148° C.

The following table reports the results obtained when treating a Pennsylvania thermally cracked gasoline having a normal induction period of about 100 minutes. The gum inhibitor used in this example comprised N,N'-di-secondary butyl-p-phenylene diamine. The copper was added as copper oleate.

*Table I*

| Additive | Induction period, minutes |
| --- | --- |
| None | 100 |
| 0.003% gum inhibitor | 395 |
| 0.003% gum inhibitor and 1 p. p. m.[1] copper | 135 |
| 0.003% gum inhibitor, 1 p. p. m. copper and 0.001% dibenzyloxaldiamidine | 390 |
| 0.003% gum inhibitor, 1 p. p. m. copper and 0.003% dibenzyloxaldiamidine | 485 |
| 0.003% dibenzyloxaldiamidine | 106 |

[1] P. p. m.—parts per million.

From the above data it is apparent that 0.001% by weight of dibenzyloxaldiamidine served to offset the deleterious effect of copper in lowering the induction period of the inhibited gasoline from 395 to 130 minutes. Furthermore, it will be noted that the use of 0.003% by weight of dibenzyloxaldiamidine served to increase the induction period of the inhibited gasoline to 485 minutes, thus showing that the dibenzyloxaldiamidine served as a synergist to increase the effectiveness of the gum inhibitor. It will be noted that the dibenzyloxaldiamidine had substantially no effect in increasing the induction period of the gasoline in the absence of copper.

EXAMPLE II

In another series of runs utilizing different samples of the same gasoline, metal deactivator and inhibitor described in Example I but in different concentrations, the following results were obtained:

*Table II*

| Additive | Induction period, minutes |
| --- | --- |
| None | 100 |
| 1 p. p. m. copper | 75 |
| 0.006% gum inhibitor | 710 |
| 0.006% gum inhibitor and 1 p. p. m. copper | 200 |
| 0.006% gum inhibitor, 1 p. p. m. copper and 0.001% dibenzyloxaldiamidine | 740 |
| 0.006% gum inhibitor, 1 p. p. m. copper and 0.002% dibenzyloxaldiamidine | 960 |
| 0.006% gum inhibitor, 1 p. p. m. copper and 0.005% dibenzyloxaldiamidine | 1,240 |

Here again it will be noted that the dibenzyloxaldiamidine served to effectively offset the deleterious effect of copper and, when in larger concentrations, served to considerably enhance the effectiveness of the gum inhibitor.

EXAMPLE III

Diphenyloxaldiamidine was prepared by the reaction of dry cyanogen with aniline. When used for the stabilization of cracked gasoline, the following results were obtained. The antioxidant used in this example comprised N,N'-di-secondary butyl-p-phenylene diamine.

*Table III*

| Additive | Induction period, minutes |
| --- | --- |
| None | 60 |
| 0.006% gum inhibitor | 625 |
| 0.006% gum inhibitor and 1 p. p. m. copper | 120 |
| 0.006% gum inhibitor, 1 p. p. m. copper +0.001% diphenyloxalamidine | 630 |

Here again it will be noted that the metal deactivator of the present invention served to effectively offset the deleterious effect of the copper and also that, when used in larger concentrations it served to increase the effectiveness of the gum inhibitor.

EXAMPLE IV

Dixylyloxaldiamidine may be prepared by the reaction of dry cyanogen with xylidine. The resultant dixylyloxaldiamidine may be used in a concentration of 0.01% by weight, in combination with 0.02% by weight of 2-tert-butyl-4-methoxyphenol for the stabilization of lard contaminated with metal and having a normal stability period of 5 hours.

EXAMPLE V

Dibutyldiimido ester of malonic acid may be utilized in a concentration of 0.002% by weight, in conjunction with 0.005% by weight of a gum inhibitor comprising N,N'-di-secondary butyl-p-phenylene diamine, for the stabilization of cracked gasoline.

EXAMPLE VI 0.004% by weight of dibenzyldiimido ester of oxalic acid may be used, in conjunction with 0.002% by weight of a gum inhibitor comprising 2,6-di-tertiary butyl-4-methylphenol, for the stabilization of kerosene.

I claim as my invention:

1. An organic material containing a metal which normally catalyzes oxidative deterioration of said organic material and additionally containing a metal deactivating amount of a compound selected from the group consisting of the diimido esters and diamidines of oxalic, malonic, succinic, glutaric and adipic acids.

2. A composition as defined in claim 1 further characterized in that said compound is a derivative of oxalic acid.

3. A composition as defined in claim 1 further characterized in that said compound is a diamidine of oxalic acid.

4. A composition as defined in claim 1 further characterized in that said compound is a diimido ester of oxalic acid.

5. Hydrocarbon distillate containing a metal which catalyzes oxidative deterioration and additionally containing a metal deactivating amount of a diimido ester of a lower dibasic organic acid selected from the group consisting of oxalic, malonic, succinic, glutaric and adipic acids.

6. Hydrocarbon distillate containing a metal which catalyzes oxidative deterioration and additionally containing a metal deactivating amount of a diamidine of a lower dibasic organic acid selected from the group consisting of oxalic, malonic, succinic, glutaric and adipic acids.

7. Cracked gasoline containing a metal which catalyzes oxidative deterioration of said gasoline and additionally containing from about 0.0001% to about 0.5% by weight of a compound selected from the group consisting of the diimido esters and diamidines of oxalic, malonic, succinic, glutaric and adipic acids.

8. Cracked gasoline containing a metal which catalyzes oxidative deterioration of said gasoline and additionally containing from about 0.0001% to about 0.5% by weight of a diamidine of oxalic acid.

9. Cracked gasoline containing a metal which catalyzes oxidative deterioration of said gasoline and additionally containing from about 0.0001% to about 0.05% by weight of dibenzyloxaldiamidine.

10. Cracked gasoline containing a metal which catalyzes oxidative deterioration of said gasoline and additionally containing from about 0.001% to about 0.1% by weight of a gum inhibitor comprising N,N'-di-secondary butyl-p-phenylene diamine and from about 0.0001% to about 0.05% by weight of dibenzyloxaldiamidine.

11. Cracked gasoline containing a metal which catalyzes oxidative deterioration of said gasoline and additionally containing from about 0.0001% to about 0.5% by weight of a diphenyloxaldiamidine.

12. Cracked gasoline containing a metal which catalyzes oxidative deterioration of said gasoline and additionally containing from about 0.0001% to about 0.05% by weight of dixyloxaldiamidine.

13. Cracked gasoline containing a metal which catalyzes oxidative deterioration of said gasoline and additionally containing from about 0.0001% to about 0.5% by weight of a diamidine of malonic acid.

14. Cracked gasoline containing a metal which catalyzes oxidative deterioration of said gasoline and additionally containing from about 0.0001% to about 0.05% by weight of a diphenylmalondiamidine.

15. Cracked gasoline containing a metal which catalyzes oxidative deterioration of said gasoline and additionally containing from about 0.0001% to about 0.5% by weight of a diimido ester of a lower dibasic organic acid selected from the group consisting of oxalic, malonic, succinic, glutaric and adipic acids.

16. Cracked gasoline containing a metal which catalyzes oxidative deterioration of said gasoline and additionally containing from about 0.0001% to about 0.05% by weight of a diimido ester of oxalic acid.

17. Cracked gasoline containing a metal which catalyzes oxidative deterioration of said gasoline and additionally containing from about 0.0001% to about 0.5% by weight of a diimido ester of malonic acid.

18. A hydrocarbon distillate containing a metal which catalyzes oxidative deterioration of the distillate and additionally containing a metal deactivating amount of a compound selected from the group consisting of the diimido esters and diamidines of oxalic, malonic, succinic, glutaric and adipic acids.

19. A composition as defined in claim 18 further characterized in that said distillate comprises gasoline.

References Cited in the file of this patent
UNITED STATES PATENTS

| | | |
|---|---|---|
| 2,388,132 | Fischer | Oct. 30, 1945 |
| 2,484,257 | Watson | Oct. 11, 1949 |
| 2,551,786 | Biswell | May 8, 1951 |
| 2,573,779 | Walters | Nov. 6, 1951 |